Oct. 7, 1958   E. FRANKEL   2,854,902
COMBINATION CAMERA AND CIGARETTE LIGHTER
Filed Sept. 6, 1955   5 Sheets-Sheet 1
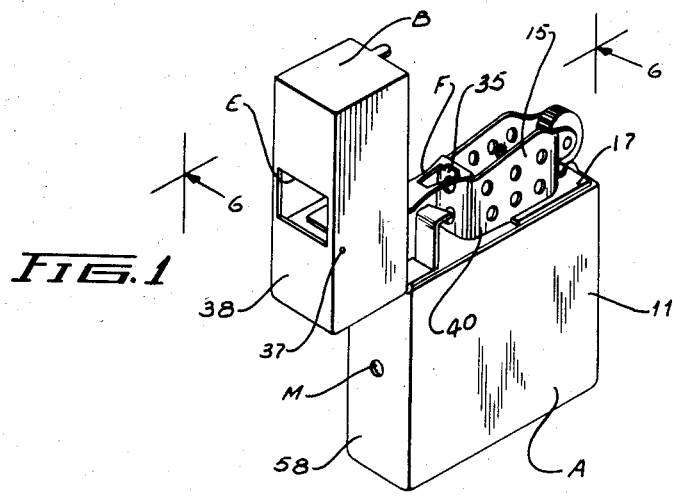
FIG.1
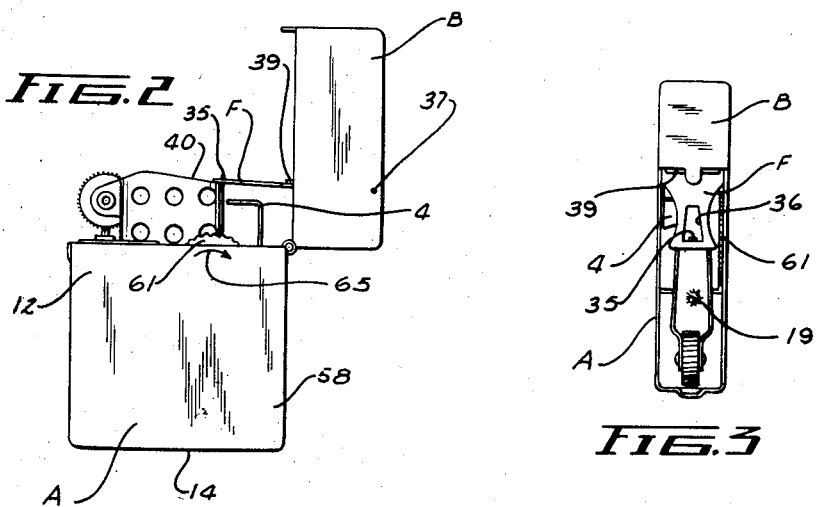
FIG.2
FIG.3
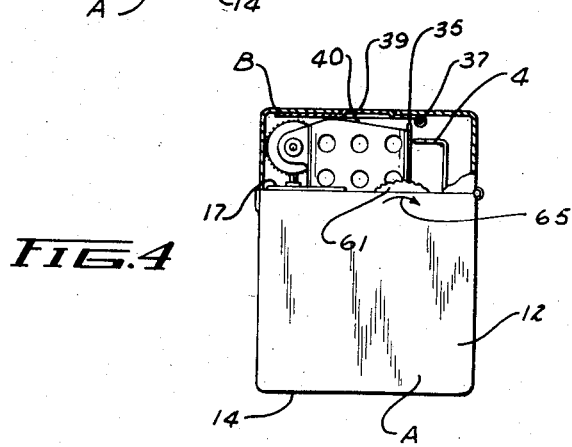
FIG.4
INVENTOR
EDWARD FRANKEL
BY
ATTORNEY Oct. 7, 1958 E. FRANKEL 2,854,902
COMBINATION CAMERA AND CIGARETTE LIGHTER
Filed Sept. 6, 1955 5 Sheets-Sheet 2

INVENTOR
EDWARD FRANKEL
BY
ATTORNEY

Oct. 7, 1958  E. FRANKEL  2,854,902
COMBINATION CAMERA AND CIGARETTE LIGHTER
Filed Sept. 6, 1955  5 Sheets-Sheet 3
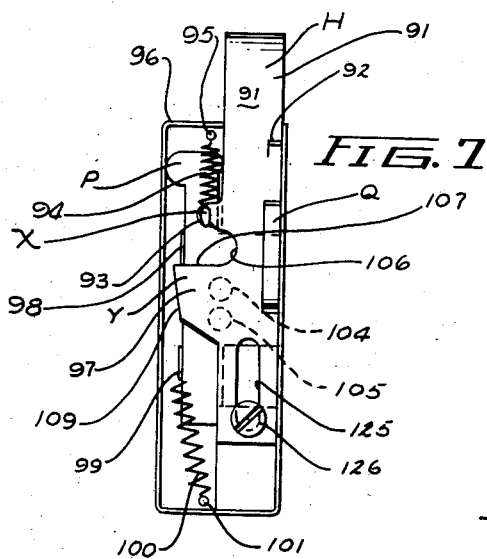
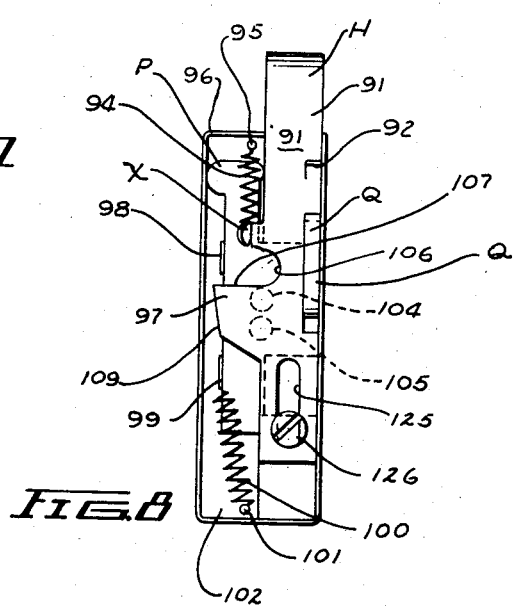
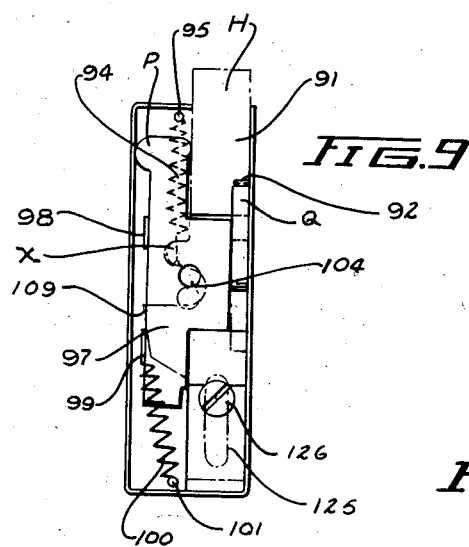
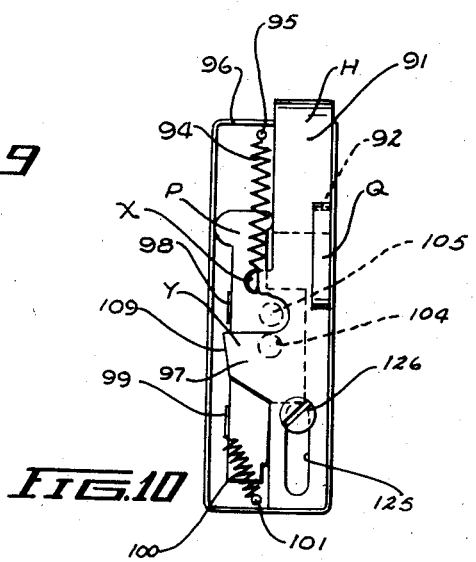
INVENTOR
EDWARD FRANKEL
BY
ATTORNEY Oct. 7, 1958 E. FRANKEL 2,854,902
COMBINATION CAMERA AND CIGARETTE LIGHTER
Filed Sept. 6, 1955 5 Sheets-Sheet 4
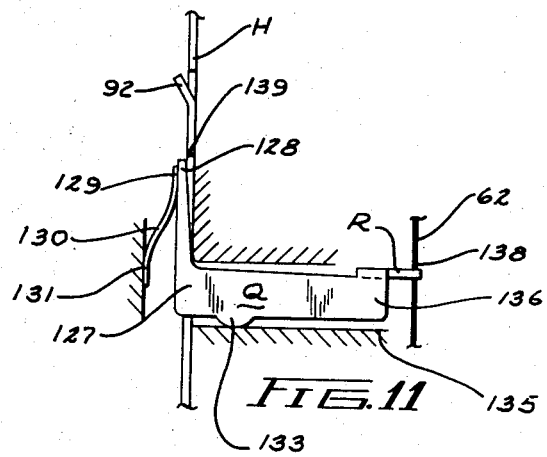
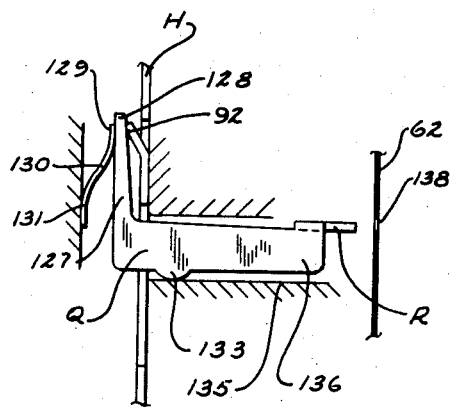
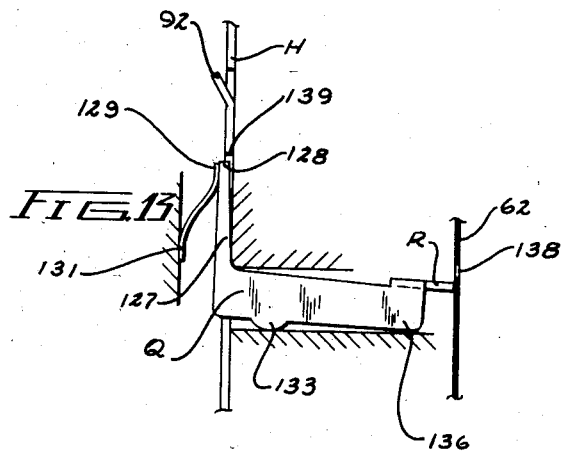
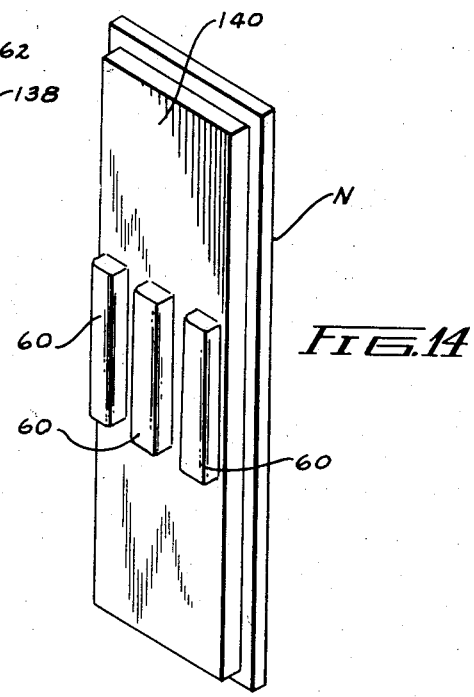
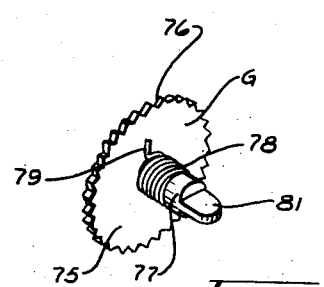
INVENTOR
EDWARD FRANKEL
BY
ATTORNEY Oct. 7, 1958  E. FRANKEL  2,854,902
COMBINATION CAMERA AND CIGARETTE LIGHTER
Filed Sept. 6, 1955  5 Sheets-Sheet 5
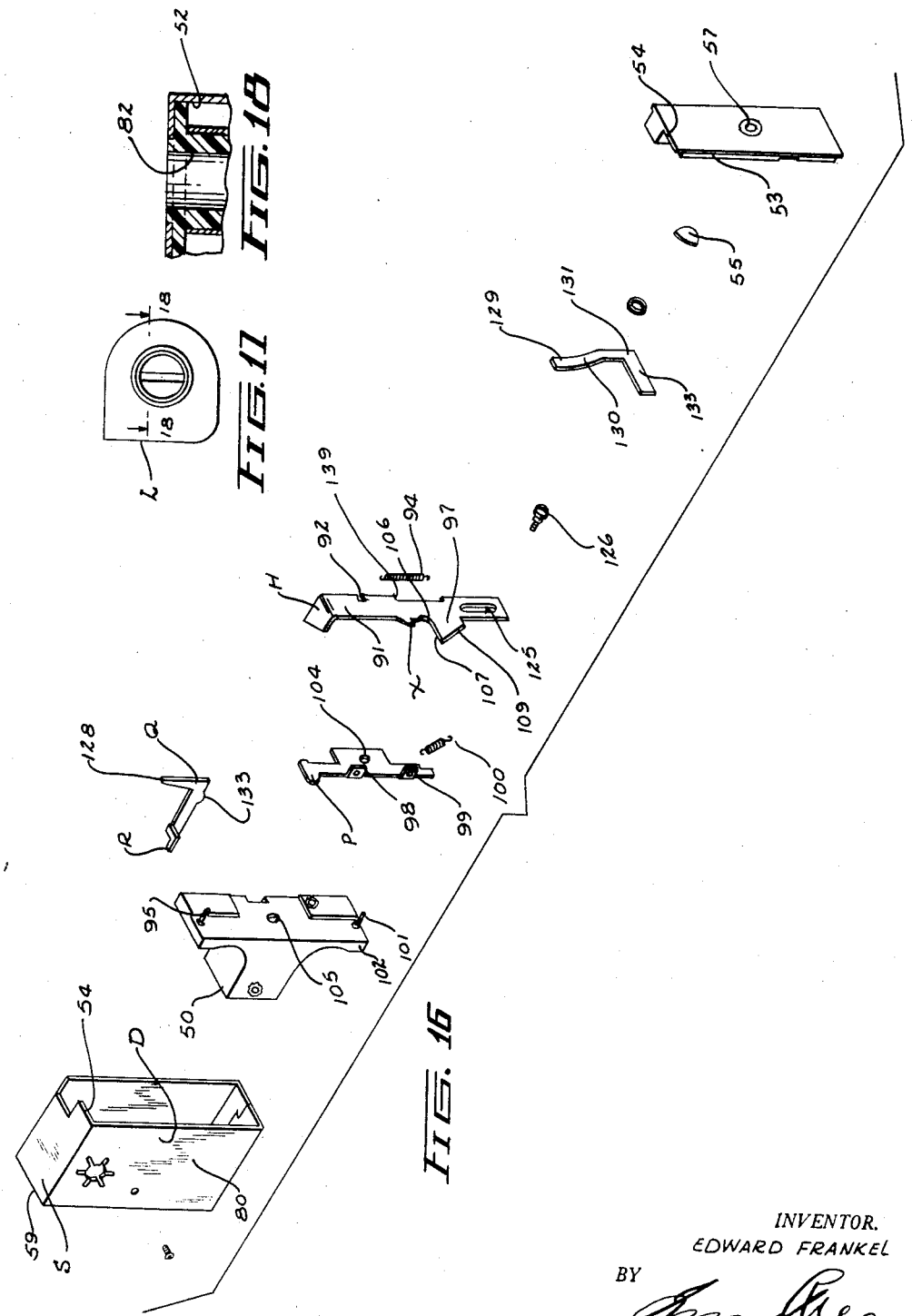
INVENTOR.
EDWARD FRANKEL
BY
ATTORNEY

United States Patent Office 2,854,902
Patented Oct. 7, 1958

2,854,902

COMBINATION CAMERA AND CIGARETTE LIGHTER

Edward Frankel, New York, N. Y.

Application September 6, 1955, Serial No. 532,618

5 Claims. (Cl. 95—12)

The present invention relates to a combination camera and cigarette lighter.

It is among the objects of the present invention to provide a compact cigarette lighter and camera which will be of normal size, and at the same time in which both the camera structure and the cigarette or cigar lighter structure may be combined in a unitary casing and each used without interference.

Another object is to provide a novel combination cigarette or cigar lighter and camera in which a compact arrangement is provided which will enable operation of the device either as a lighter or as a camera without substantial increase in bulk of the normal size and weight of a cigarette lighter, and which will permit taking miniature pictures subject to enlargement of great fidelity and easy enlargement qualities.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, according to one embodiment of the present invention, the outside casing of a cigarette lighter is provided with two closely fitting structural elements therein, one of which is a cigarette lighter and the other of which is a camera.

The cigarette lighter is desirably provided with a swinging cover structure which will serve both as a cover to extinguish the lighter and also it will be provided with a central rectangular opening to serve as a view finder for the camera portion.

Desirably, the cigarette lighter structure which has a rectangular inside housing is also provided with a windshield which will extend over and hold the camera housing in place by extending over the camera housing toward the hinge or cover. The camera housing will also be of rectangular shape.

The back of the outside casing, adjacent the hinge of the lid, will be provided with a lens opening which will cooperate with the view finder opening in the hinged cover to give the correct picture. At one side of the main casing adjacent the hinge structure, and to the rear of the windshield will be provided the release device for exposing the film or taking a snapshot and at the other side there will be a knurled wheel device for advancing the film.

A feature of the present invention resides in the fact that the cover is latched in respect to the windshield so that it will assume a predetermined position when opened which is required to give the proper view finder for the camera structure.

Furthermore, the same latching device will serve to fill the view finder opening in the swinging cover when the cover is closed.

The camera structure itself will be provided with a readily removable cover which is held in position by contact with the cigar or cigarette lighter unit, and which when removed will permit access to and removal of the exposed film as well as threading in position a fresh roll of film.

The strip of film is normally provided with sprocket openings along one side thereof which will engage a nose or extension of an L-shaped safety lever. This safety lever serves both to hold the film in fixed position for exposure purposes and when released, upon exposure of the film, will also serve to prevent a double exposure.

As the film is advanced by the knurled wheel device the next sprocket opening will engage the extension or nose of the safety lever and be held or locked into the proper exposure position, while at the same time the L-shaped safety lever is moved out of locking position so that another operation of the exposure lever may take place.

Each time the exposure lever is pressed down it will release the nose of the safety lever from its latched-in position along the edge of the film permitting the film to be advanced one frame before the latching again takes place.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Fig. 1 is a side perspective view of one embodiment of the present invention with the cover elevated in view finding position with the lens opening shown.

Fig. 2 is a side elevational view from the opposite side of the perspective view of Fig. 1 with the cover up.

Fig. 3 is a top plan view with the cover up.

Fig. 4 is a side elevational view from the opposite side of Fig. 2 with the cover down and with the cover vertically sectioned so as to show the interior structure.

Fig. 7 is a front elevational view of the camera unit with the front of the camera removed showing the shutter release up and the shutter in inactive position.

Fig. 8 is a front elevational view similar to Fig. 7 showing the position of the shutter release as it starts to move.

Fig. 9 is a front elevational view similar to Figs. 7 and 8 showing the shutter release in depressed position just after it has released the shutter blade and just before the shutter blade is about to drop.

Fig. 10 is a front elevational view similar to Figs. 7, 8 and 9 showing the shutter release all the way down and with the spring having pulled the shutter blade to lowered position after the exposure has taken place.

Fig. 11 is a diagrammatic side elevational view showing the exposure lever or shutter release in its position just before it is pressed down in the position of Fig. 7.

Fig. 12 is a side elevational view similar to Fig. 11 showing the exposure lever or the shutter release in its lowermost position as it is in Fig. 10.

Fig. 13 is a side elevational view similar to Figs. 11 and 12 showing the position of the mechanism and the exposure lever after the exposure has taken place and before the film has moved a frame.

Fig. 14 is a perspective elevational view showing the cover for the camera structure.

Fig. 15 is a side perspective view of the film advancing wheel.

Fig. 16 is an exploded perspective view of the metal casing of the front of the camera housing.

Fig. 17 is a plan view of the casette for holding the film.

Fig. 18 is a partial transverse sectional view on the line 18—18 of Fig. 17 showing the lip and casette.

Referring to Figs. 1 to 5 there is shown a cigar or cigarette lighter casing A of usual size, having a swinging cover B which receives the cigar or cigarette lighter structure or unit C and the camera structure of unit D.

The camera unit to which this invention is most particularly directed has a finder opening E positioned in the cover B which is held in position by means of a swinging latch F.

Figure 5:
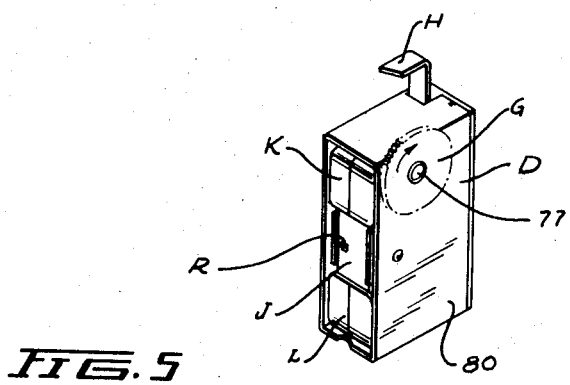
Fig. 5 is a side perspective view of the camera structure removed from the casing of Figs. 1 to 4 and showing the cover of the camera structure removed and exposing the film and the film cartridges.

In addition, as best shown in Fig. 5, the camera structure has a film advancing wheel G and a shutter release or exposure lever H, a film strip J and the film cartridges K and L.

The camera unit in addition has a lens-carrier structure M and a rear cover structure N (see Figs. 5 and 14).

The controlling mechanism of the camera structure is best shown in Figs. 7 to 13, and it includes the reciprocating exposure lever or shutter release H, the reciprocating shutter blade P, the L-shaped double-exposure-prevention safety lever Q. The safety lever Q is provided with holder nose or extension R to hold the film in position before exposure to release.

Referring particularly to the lighter structure, it will be noted that the lighter unit C in Fig. 5 closely fits between the front wall 10 and the side walls 11 and 12 of the outer casing. Its bottom 13 is held up from the bottom 14 of the main casing by the windshield 15 which projects over the camera unit D, as indicated at 16, and rests on top of the camera unit D, as indicated at S in Figs. 1 and 5.

The windshield 15 is welded or otherwise permanently attached at its end portion 18 to the top wall 17 of the lighter structure C.

Interiorly of the windshield 15 is positioned the wick 19.

The ends of the windshield have the parallel projecting ears 20 which receive the pivot 21 for the ratchet or burr wheel 22 which acts upon the adjustable flint 23.

The bottom of the lighter unit C has a flint screw 24 which when removed will permit access to and adjustment of the flint 23. It also has a filler plug 25 which when removed will permit access to and introduction of the lighter fuel into the casing C.

It will be noted that the end wall 26 of the lighter unit C rests against the end 10 of the main casing A, and the wall 27 rests against the removable cover plate N of the camera structure and holds it in position.

The windshield 15 is provided with an upward projecting tab or stop element 35 which serves to engage the end of the opening 36 of the swinging cover latch F. This swinging cover latch F is pivotally mounted at 37 adjacent the base 38 of the cover B alongside of the view opening E. The latch F has a projecting portion 39 which, when the cover B is closed, will fit into the view-finding opening E, as shown best in Fig. 4.

A coil spring is associated with the hinge 37 to normally bias the latch F down against the top edge 40 of the windshield 15.

It will be noted that the latch F will engage the lip 35 of the windshield 15 so as to hold the cover B in proper position to provide a view through the finder E.

Referring to the camera structure itself the camera has a plastic body 50 with recesses at 51 to receive the upper cartridge K, and 52 to receive the lower cartridge L.

The camera unit D has the removable front cover plate 53 which is shouldered at 54 to hold it in position, and it will receive the lens 55 in the central recess 56 forming part of the lens structure M. This lens structure is aligned with the opening 57 in the wall 58 of the casing A.

The rear wall N is also shouldered as indicated at 59 to fit the edges of the camera housing, and it has projections 60 to close the exposure chamber 61 in the rear of which, as indicated at 62, the film being exposed is held in position across the projecting portions 63 and 64 of the camera structure 50.

The film as shown is designed to be advanced in the direction indicated by the arrow 65, that is, in an upward direction from the lower cartridge L to the upper cartridge K.

This is accomplished by the wheel G which is shown assembled in Fig. 5, but removed from the camera unit in Fig. 15. This wheel G, as best shown in Fig. 15, is a flat metal disc 75 which is knurled or ridged at its periphery as indicated at 76, and has a shaft 77.

The shaft 77 has a one-direction spring 78 which engages, by the tongue 79, the slots in the side wall 80 of the housing of the camera D, and which also has a fin projection 81.

This reduced or flattened fin 81 will engage the end of the tubular shaft 82 of the spool upper casette element K.

The front operating mechanism of the camera is best shown in Figs. 7 to 13, and in Fig. 15.

The shutter release lever H has an overturned lip 90 which projects under the latch F but is readily accessible from the side of the casing A, as best shown in Fig. 1.

It also has the downwardly projecting structure 91 with the outturned element 92, which element 92 acts upon the safety lever Q for preventing double exposures.

The main shutter release element H has an outwardly projecting tongue 93 which holds one end of the spring 94. The other end of the spring is mounted at 95 to the top wall 96 of the camera housing and tends to bias the shutter release lever H upwardly.

Figure 6:
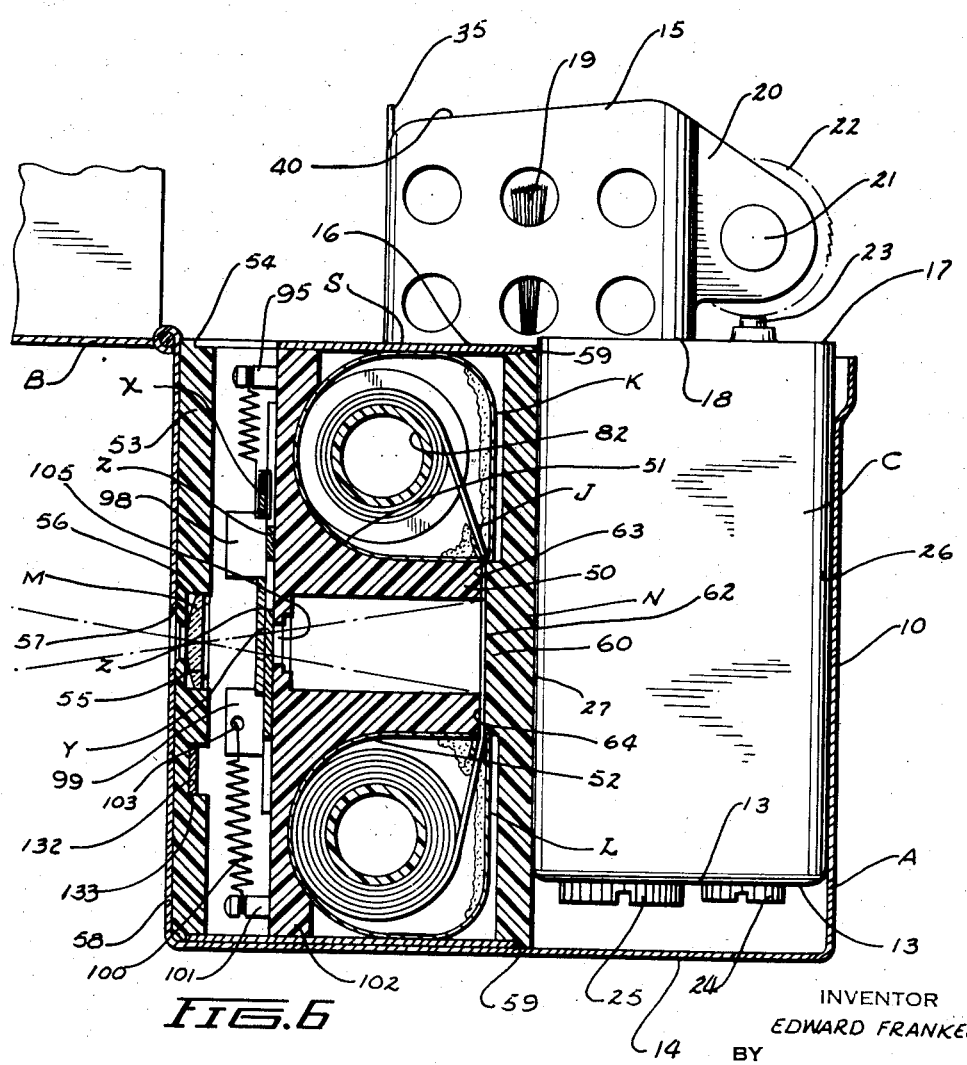
Fig. 6 is a transverse vertical sectional view upon the line 6—6 of Fig. 5 upon an enlarged scale as compared to Fig. 5.

The shutter release lever H also has a forwardly projecting nose 97 which is designed to ride under the tab or projection 98 on the side edge of the shutter blade P (see also Fig. 6).

The shutter blade P also has a lower forwardly extending tab 99 to which the upper end of the coil spring 100 is attached at the opening 103 (see Figs. 6 to 10).

The coil spring extends from the opening 103 at the tab 99 obliquely downwardly and inwardly to the post 101. The post 101 is mounted in and extends forwardly from the lower portion 102 of the plastic body 50.

The shutter blade P will move together with the shutter release H when the sprocket member or tooth member R is released from the film R and after the exposure has taken place.

It will be noted that in the position shown in Figs. 7 and 8 the nose 97 is covering the shutter opening 104 in the blade P as well as the opening 105 which permits the light to enter the exposure chamber 61 and strike the film at 62.

On the downward movement of the shutter release H the shutter release H will first move independently of the blade P until the recess 106 in the shutter release H uncovers the opening 104 in the shutter blade P.

At this stage the opening 104 is above the exposure chamber opening 105. Then, this involves motion of the shutter release H downwardly from the position of Fig. 7 to the position of Fig. 8.

As shown by comparison of Figs. 7 and 8 the upper edge 107 of the nose 97 will move from below the tab 93 a distance indicated by the numeral 108.

Then as the nose 97 moves downwardly from the position of Fig. 8 to the position of Fig. 9, the oblique camming nose edge 109 will act upon the tab 99 with the result that the blade P will be abruptly pulled down by the spring 100 across the chamber opening 105 permitting $\frac{1}{25}$ or 1/50 exposure to take place of the film 62 into the opening 105 and the lens 57.

It is this snap action of the shutter blade P in back of the shutter release H that assures the correct exposure of the film 62 at the back of the chamber 61.

Releasing of the shutter blade P is assured by the edge 109 of the nose 97 pressing the tab 99 slightly to the left, as shown in Fig. 9, which will release such shutter blade from its "held up position" as shown in Figs. 7 and 8.

In the final position of Fig. 10 the spring 100 has pulled the shutter blade to its lower-most position and exposed the film which follows immediately after the nose edge 109 has acted upon the lower tab 99 and pressed it slightly to the left.

The vertically reciprocatory movement of the shutter release H is guided by means of the slot 125 which rides on the screw 126. At the same time as this occurs the double exposure prevention mechanism, as shown in Figs. 11 to 13, will be effective.

The double exposure L-shaped lever Q, as shown in Figs. 11 to 13, has an upwardly extending member 127 which tapers off towards its upper end 128 and is biased to the right by means of the upper end 129 of the leaf spring 130.

The lower end of the leaf spring 130 is mounted at 131 upon the inside face of the plastic cover plate 53.

The lower edge of the spring 130 is anchored by the transverse member 132 which is held in the recessed portion 133 of the front plastic cover plate 53 (see Fig. 6).

The camming tab 92 at the right of the shutter release H as shown in Figs. 7 to 10 will ride in back of the upper end 128 of the upright portion 127 of the double exposure prevention lever Q.

It will be noted that the double exposure prevention lever Q has a knob or pivot bulge 133 which pivots on the floor 134 of the recess 135. The rear end 136 of the lever Q has an outwardly extending tab 137 which serves as the latch R which engages the sprocket hole 138 in the film strip 62.

As shown in Figs. 11, 12 and 13 after each exposure the tab R will first be displaced forwardly and pulled out of the sprocket hole 138 in the film strip 62 and then will be pressed back so that the tab R then rests below the sprocket hole 138. No further exposure then may be made.

This is so because after the release of the shutter blade P pressure on the shutter lever or exposure lever H will not actuate the shutter since the safety will not permit full travel thereof by reason of the edge 139 striking the upper end 128 of the lever Q.

However, when the film is wound up on the frame by movement of the lever H in the direction of the arrow 65, the next sprocket 138 will engage the tab R and pull the lever Q outwardly to the position shown in Fig. 11, in which case the edge 139 may slide in back of the lever portion 127 and disengage the notch bar from the sprocket hole 138, as shown in Fig. 12, with repetition of the cycle which terminates in the position shown in Fig. 13.

The rear cover N which is held in position by means of the lighter casing C has a projecting rear portion or base portion 140 which carries the ridges 60 forming the slide faces or guides for the film 62 when it passes the exposure chamber, as shown in Fig. 5.

The assembly and disassembly are relatively simple with the cartridge K and L being readily removable from the upper and lower chambers by means of removal of the cartridge C and the upper plate N.

The front of the camera mechanism may also be worked upon or serviced by means of the front cover plate 53 carrying the lens M. When the two plates 53 and N are in position and the film cartridges K and L have been placed in the camera the unit may be slid into the main casing A, and the lighter casing C may be placed in back thereof in the position shown in Fig. 5.

To operate the camera then, the finder is latched in the position shown in Figs. 1 and 2, and when a suitable view is found the shutter release H is pressed down, which will result in the movements indicated in Figs. 7, 8, 9 and 10 with the film being exposed in the interval between the position of Fig. 8 and the position of Fig. 10. When this occurs the lever Q moves from the position of Fig. 11 to the position of Fig. 13.

To restore the lever from the position of Fig. 13 to the position of Fig. 11 the wheel G is turned in the direction of the arrow 65 until the next sprocket hole 138 comes opposite the latch R.

In this case the latch R will engage in the hole 138 and will be pulled up and into the position shown in Fig. 11 permitting the exposure lever to slide down in back of the leg 127 of the safety lever Q, whereupon other exposure may be made.

It is thus apparent that the applicant has provided a simple combination camera and lighter, very compact and readily carried in the pocket, which may be utilized for taking pictures when the user thereof is apparently securing a light or is lighting his cigar or cigarette.

The entire arrangement occupies no more volume than a standard cigarette lighter and is a unique, attractive article which will permit the taking of exposures which will produce enlargements of standard size.

While there has herein been illustrated and described the preferred embodiment of the invention, it is to be understood that applicant does not limit himself to the precise construction herein disclosed, and the right is reserved to all changes and modifications coming within the scope of the invention as defined in the appended claims.

Having now particularly described and ascertained the nature of the invention, and in what manner the same is to be performed, what is claimed is:

1. In association with a cigarette lighter having an outer casing with a sub-assembly lighter casing in said outer casing having an upwardly and literally projecting windshield with a latch-engaging tit on the top edge thereof and a swinging cover having a latch bar engaging said tit when the cover is opened to hold the cover in vertical position, said outer casing also including another sub-casing carrying a miniature camera having a rectangular casing with an internal plastic structure with film cartridge receiving receptacles and a central exposure chamber and front and back closure plates, a top accessible exposure lever, a shutter blade having a lost motion connection with said lever and a safety lever actuated by said exposure lever to release the film to move to the next exposure position and a one direction rotatable wheel to turn the film after each release to the next exposure position, said laterally projecting windshield projecting over the camera sub-assembly casing to hold it in position and said exposure lever being positioned below and being protected against inadvertent operation by said latch bar.

2. The camera of claim 1 in which the front plate has a spring presser member to press upon said exposure lever and said safety lever and bias said safety lever to latch said film.

3. In association with a cigarette lighter having an outer casing with a sub-assembly lighter casing in said outer casing having an upwardly and laterally projecting windshield with a latch-engaging tit on the top edge thereof and a swinging cover having a latch bar engaging said tit when the cover is opened to hold the cover in vertical position, said outer casing also including another sub-casing carrying a camera structure having front lens plate, a rear cover plate, an encircling rectangular casing, an exposure lever, an exposure blade operated by said exposure lever, a safety lever operated by said exposure lever, said lever having a latch, the film strip being notched to engage said latch and a side wheel to advance said film strip, said laterally projecting windshield projecting over the camera sub-assembly casing to hold it in position and said exposure lever being positioned below and being protected against inadvertent operation by said latch bar.

4. In association with a cigarette lighter having an outer casing with a sub-assembly lighter casing in said outer casing having an upwardly and laterally projecting windshield with a latch-engaging tit on the top edge thereof and a swinging cover having a latch bar engaging said tit when the cover is opened to hold the cover in vertical position, said outer casing also including another sub-casing carrying a camera structure having front lens plate, a rear cover plate, an encircling rectangular casing, an exposure lever, an exposure blade operated by said exposure lever, a safety lever operated by said exposure lever, said lever having a latch, the film strip being notched to engage said latch and a side wheel to advance said film strip, said front lens plate having a spring member to press upon said exposure lever and said safety lever, said laterally projecting windshield projecting over the camera sub-assembly casing to hold it in position and said exposure lever being positioned below and being protected against inadvertent operation by said latch bar.

5. A lighter-camera combination comprising a main rectangular case receiving in side-by-side relationship a camera sub-casing and a lighter sub-casing, a swinging cover for said main casing having a hinge at one end of said main casing, said camera sub-casing being adjacent to said hinge, said lighter sub-casing having an upstanding offset laterally projecting tubular windshield with an upward tab extension on the top thereof, said windshield extending over and holding said camera sub-casing in position, a swinging plate latch pivotally mounted on said cover and engaging said tab extension when the cover is open and holding said cover in vertical position and an operating lever for said camera sub-casing position under said latch so as to prevent inadvertent operation of said latch.

References Cited in the file of this patent
UNITED STATES PATENTS
2,674,166    Sochor _____ April 6, 1954
OTHER REFERENCES
Advertisement of Capital Camera Co., in "Washington Star" newspaper, December 13, 1952.